United States Patent [19]
Lagana

[11] Patent Number: 4,553,783
[45] Date of Patent: Nov. 19, 1985

[54] MOTOR VEHICLE WITH ITS BODY IN THE FORM OF A VOLUMETRIC SHELL OF RESILIENT MATERIAL

[76] Inventor: Giuseppe Lagana, Via Fiano n. 14, Torino, Italy

[21] Appl. No.: 473,614

[22] Filed: Mar. 8, 1983

[30] Foreign Application Priority Data

Mar. 19, 1982 [IT] Italy ................................ 67352 A/82

[51] Int. Cl.$^4$ ............................................. B62D 29/04
[52] U.S. Cl. .................... 296/31 P; 280/756; 296/84 R
[58] Field of Search .............. 296/31 P, 185; 114/270; 280/756

[56] References Cited

U.S. PATENT DOCUMENTS

| | | | |
|---|---|---|---|
| 3,215,113 | 11/1965 | Roberts | 296/185 |
| 3,836,192 | 9/1974 | Wilfert | 296/31 P |
| 4,049,309 | 9/1977 | Seal | 296/185 |
| 4,202,579 | 5/1980 | Berggren | 280/756 |
| 4,355,841 | 10/1982 | Ghidella | 296/31 P |
| 4,453,763 | 6/1984 | Richards | 296/31 P |

FOREIGN PATENT DOCUMENTS 965453  4/1975  Canada ............................ 296/31 P

*Primary Examiner*—Robert R. Song
*Attorney, Agent, or Firm*—Young & Thompson

[57] ABSTRACT

The invention relates to a motor vehicle of which the shell is entirely constructed of resilient impact-resistant material configured into a structure of integrated volumes which is fitted on to a load-bearing base comprising all the mechanical members. In this respect, the term "shell" signifies that which in conventional motor vehicles is represented by the body together with the compartments for housing the mechanical members and passengers. The proposed vehicle is therefore composed of a lower body portion or frame to which the wheels and transmission and control members are connected, on which there is a structure formed from one or more blocks or sheets of resilient material, configured as volumes which harmonically blend the outer shape and the passenger compartments into a unified combination.

2 Claims, 3 Drawing Figures

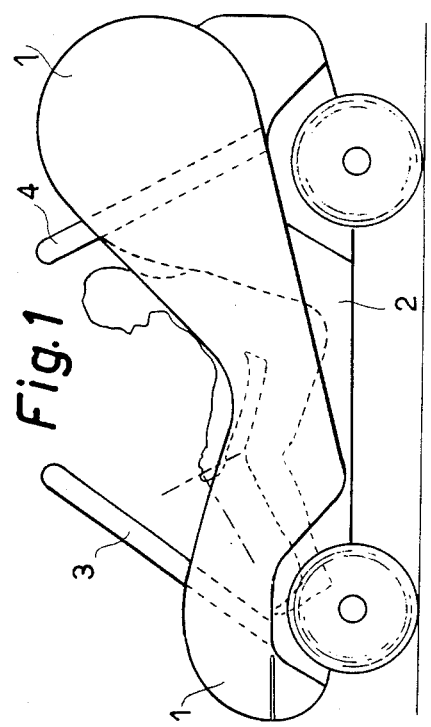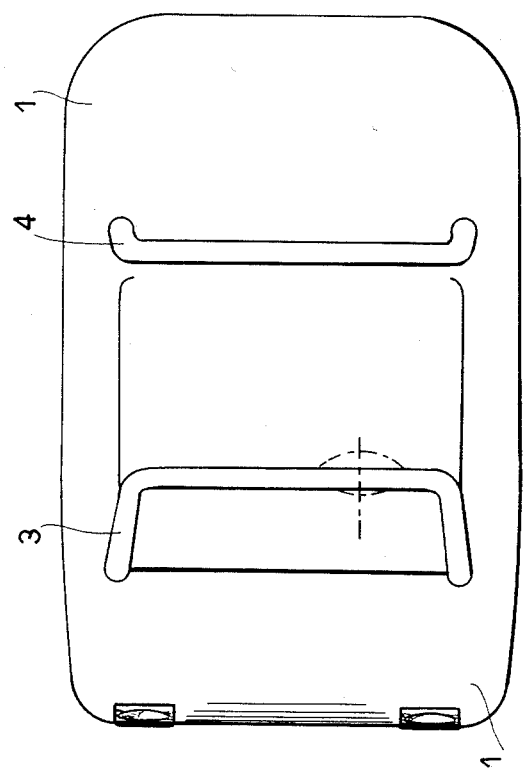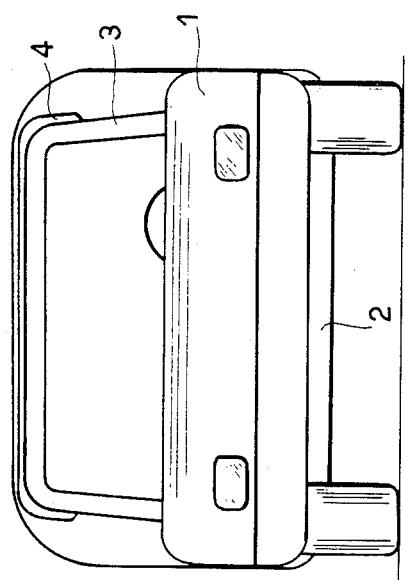
Fig.1
Fig.2
Fig.3

MOTOR VEHICLE WITH ITS BODY IN THE FORM OF A VOLUMETRIC SHELL OF RESILIENT MATERIAL

DESCRIPTION

The history of the automobile originates from the initial attempts to replace animal traction by mechanical traction with wheel-mounted vehicles. The innovation represented by the engine, initially steam and then internal combustion, did not immediately lead to great changes in the appearance of vehicle structures, so that the first automobiles curiously reproduced the character of the horse-drawn carriages which they were gradually replacing. Limited artisan production restricted the choice of materials, and led to the practically exclusive use of wood or manually hammered sheet metal.

Subsequent industrialisation resulted in a continuous development of the technology applied to the mechanics of automobile members, but in spite of the concentrated studies in this specific sector there appears to have been no great modification in the overall appearance of the automobile, which although adapted in its shape to the latest aerodynamic principles (particularly with respect to the speed increase obtained) and to changes in market tastes, does not deviate from a constant re-elaboration of traditional concepts, instead of being distinguished by revolutionary changes. It would now seem appropriate, after more than three quarters of a century, to apply important transformations suggested by the acquisition of new production methods for synthetic materials, by electronics and by the need to use alternative energy sources. Within this framework, the proposal under examination can be expressed as the original conception of a body (a term which in this case would appear imprecise but which for convention can be applied to the new identity) constructed of "soft", "resilient" or "plastic" material, which is stylistically worked into a structure which harmonically integrates the overall volumes with the passenger and control instrumentation compartments. The concept can be obviously developed differently according to the specific use of the vehicle to which it is applied, and to the characteristics of the mechanical base, the term "base" signifying the system comprising the engine, the transmission members, the traction members and the steering with all the control and guide devices. This base can be constituted either by a single rigid assembly or by a structure with variable dimensional characteristics, composed of elements which are assembled together by telescopic or elastic connections such as coil springs or leaf springs. By way of example, the accompanying drawing shows a stylistic design for a motor vehicle which has the characteristics of the claims according to the invention, and the description given hereinafter relates thereto.

In the drawings:
FIG. 1 is a side view;
FIG. 2 is a front view;
FIG. 3 is a plan view.

The example indicated relates to a two-seat motor vehicle suitable for sporting use, and convertible by suitable arrangements into an off-the-road amphibious vehicle. It is characterised by a shell of sinuous line with rounded volumes, which can be constructed by different methods according to the materials used.

Although the best constructional characteristics would appear to derive from choosing from the wide range of mouldable expanded materials, such as the polyurethanes of cellular structure, to which a surface finish of pleasant appearance can be given during moulding, and which are suitable for mass production, it is also possible to use artisan and industrial methods which have been tried in the nautical field to obtain results of equally valid effect with pneumatically inflated structures. As an alternative to the moulded structure of expanded material, whether this is made in a single block or in unit parts to be assembled on the mechanical base, a whole range of modifications can be contmeplated which derive conceptually from the same inventive basis. One example can comprise tubular elements of flexible plastics material which are suitably shaped and filled with air or incoherent materials (polystyrene, various expanded materials, scrap materials etc.), and then joined together by connections or included in an envelope in such a manner as to assume the required volumetric shape. A further modification can be represented by a series of pneumatic or expanded elastic cushions made into blocks of different thicknesses and superposed in the form of a pack with locking elements. In addition, in seeking special appearance effects, it is also possible to choose within the range of materials produced in the form of flat sheets suitable for making-up into inflatable chambers (consideration can for example be given to rubber with a hair-like coating used for tennis balls). The mechanical base, which in the most simple design would comprise a type of rigid frmae on which the various mechanical members are mounted, can also be designed to follow the deformability of the resilient structure superposed on it, in the case of collision or particular stresses. This is attained by making the base in the form of several separate parts connected together by elastic articulation devices (coil springs, leaf springs, elastic couplings etc.), or by telescopic members, In all cases, the assembled result is a very versatile and extremely light vehicle of which the production is considerably simplified and which is safer from the accident viewpoint.

The idea consequently satisfies the requirement of reducing production cost and in particular time, and in addition gives previously unknown performance to the motor vehicle. Among its other merits, the lightness and floatability of the structure are important, this making it possible to use the vehicle under quite unusual conditions, as a vehicle which is suitable for all types of ground, is amphibious, and transportable by air so making it suitable for military use, and also suitable for sporting purposes without this however detracting from its advantages as a town vehicle which is agile in traffic and is able to emerge undamaged from small collisions, scraping in difficult passages etc. In the example shown on the accompanying drawing, the resilient structure is indicated by 1, and the reference numeral 2 indicates the load-bearing base which houses the rear engine and the other mechanical members. The vehicle is fitted with protection roll bars 3 and 4 which are fixed rigidly to the base itself, and of which the front bar 3 embraces the windscreen. The seats for the driver and passenger are formed in the concavity produced in the centre of the resilient structure.

I claim:
1. A motor vehicle comprising a load-bearing base which houses a rear engine of the vehicle, and on the load-bearing base a soft body which has in its center a concavity for seats for the driver and passenger, said body being entirely of molded expanded soft cellular material, and roll bars fixed rigidly to said base, there being a forward said roll bar which embraces a wind screen of the vehicle.

2. A motor vehicle as claimed in claim 1, in which said material of the body is a polyurethane of cellular structure.

* * * * *